A. LOVELL.
DUMPING APPARATUS.
APPLICATION FILED OCT. 28, 1919.
1,360,124.
Patented Nov. 23, 1920.
2 SHEETS—SHEET 1.
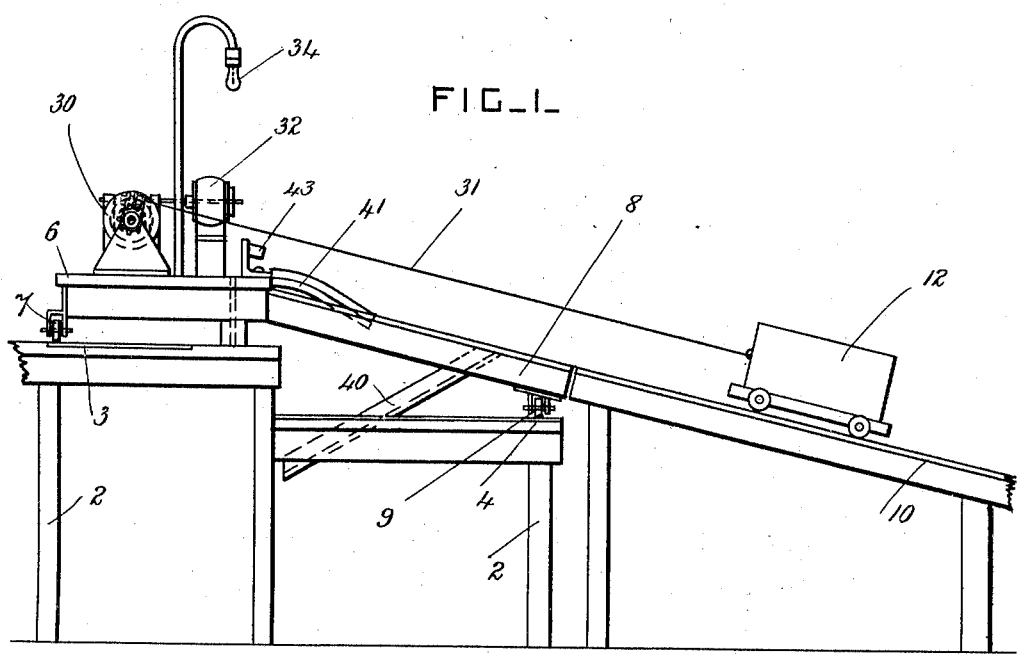
FIG_1_
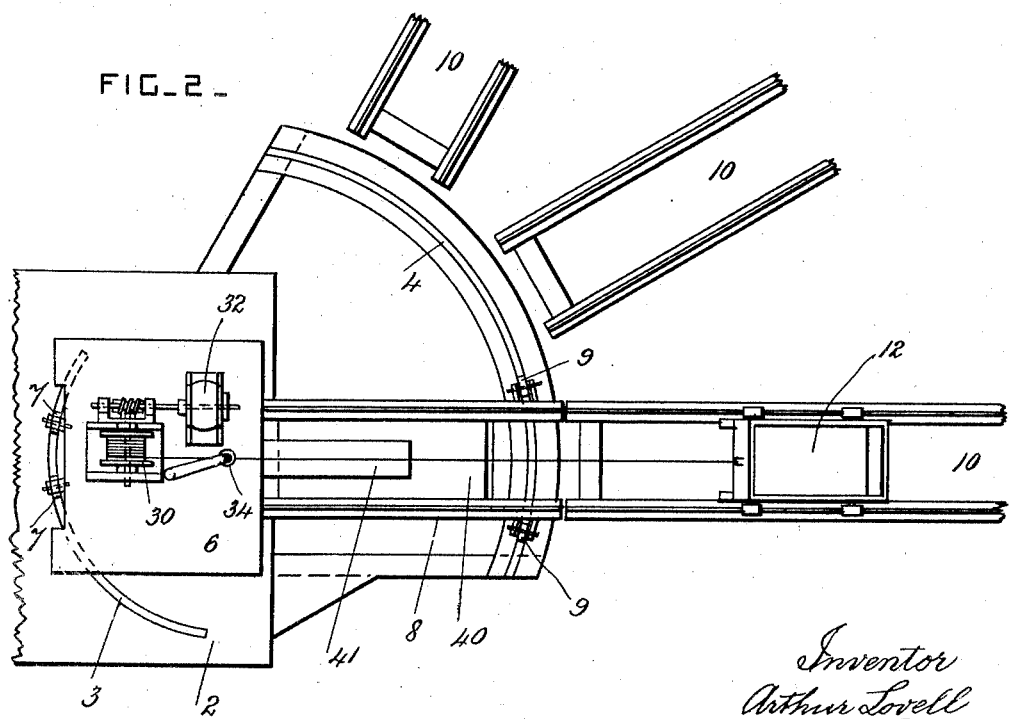
FIG_2_
Inventor
Arthur Lovell
by Herbert W. Jenner
Attorney.

A. LOVELL.
DUMPING APPARATUS.
APPLICATION FILED OCT. 28, 1919.
1,360,124.
Patented Nov. 23, 1920.
2 SHEETS—SHEET 2.
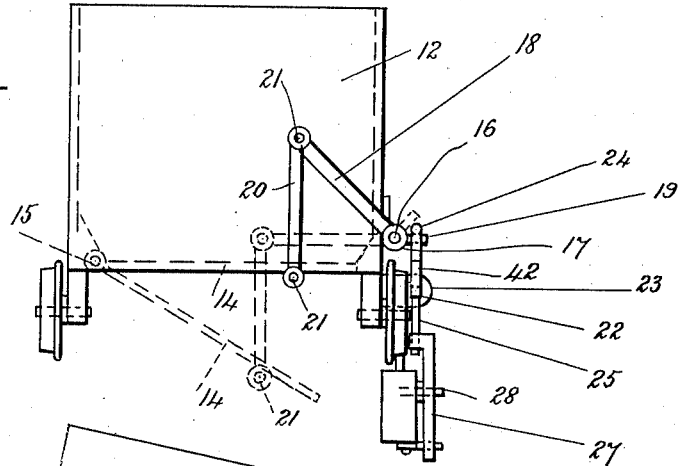
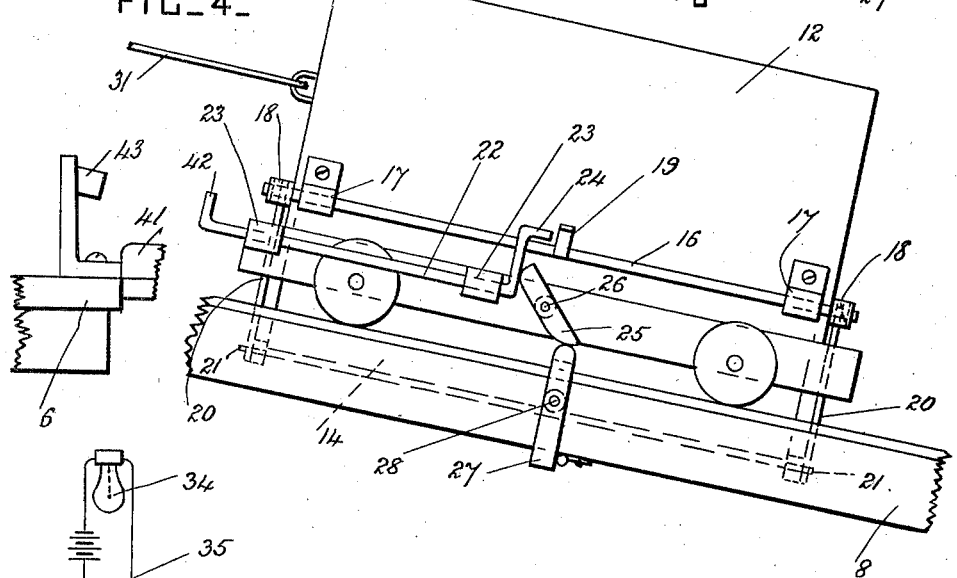
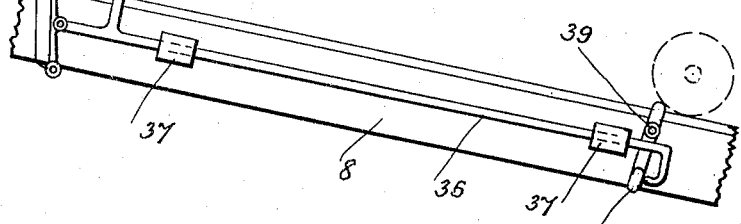

UNITED STATES PATENT OFFICE.

ARTHUR LOVELL, OF DOUTHAT, OKLAHOMA.

DUMPING APPARATUS.

1,360,124.                   Specification of Letters Patent.        Patented Nov. 23, 1920.

Application filed October 28, 1919. Serial No. 333,994.

*To all whom it may concern:*

Be it known that I, ARTHUR LOVELL, a citizen of the United States, residing at Douthat, in the county of Ottawa and State of Oklahoma, have invented certain new and useful Improvements in Dumping Apparatus, of which the following is a specification.

This invention relates to dumping apparatus used in connection with electric tram systems for handling the dirt from mines; and it consists in the novel construction and combination of the parts hereinafter fully described and claimed.

In the drawings, Figure 1 is a side view of the dumping apparatus. Fig. 2 is a plan view of the same. Fig. 3 is an end view of one of the trucks showing the latch mechanism, with the truck bottom raised. The dotted lines show the position of the parts when dumping. Fig. 4 is a side view of the truck showing the position of the parts when dumping. Fig. 5 is a detail side view of the switch mechanism for operating the electric light signal.

A supporting frame 2 is provided at the dump where the material is unloaded, and has a raised track 3 formed on a circular arc, and a lower track 4 also formed on a circular arc concentric with the track 3 but arranged at a greater distance from its center and at a lower level.

A flat turntable 6 is provided and is mounted on wheels 7 which run on the upper track 3. A downwardly inclined railroad track section 8 is secured at its upper end to one side of the turntable, and has wheels 9 at its lower end which run on the lower track 4. The supporting frame is of any approved construction, and the inclined railroad track is formed of longitudinal members suitably braced together and having track rails secured to them.

A plurality of stationary railroad tracks 10 is arranged radially of the turntable, and they are inclined at their end portions to suit the inclination of the movable track section 8. The railroad tracks 10 extend from the dump to the various mine shafts, and as many of them are provided as there are mine shafts.

A truck 12 of any approved construction is arranged to run on the tracks 10 and the track section 8 which is turned around with the turntable so as to connect with the various tracks 10. The truck 12 has a bottom 14 connected to it by hinges 15 at one side so that it will open downwardly. A bar 16 is journaled in bearings 17 on the other side of the truck from the hinges, and has arms 18 at its ends and a catch 19 at its middle part. The arms are pivotally connected with the ends of the truck bottom by rods 20 and pins 21.

A latch-bar 22 is slidable longitudinally in guides 23 secured to one side of the truck, and it has a hook-shaped latch 24 at one end for engaging with the catch 19. When the latch is slid longitudinally out of engagement with the catch 19 the weight of the bottom and the material in the truck causes the material to be dumped automatically. A dog 25 is pivoted to the truck by a pin 26 and operates to retract the latch-bar when moved in one direction. This dog turns without operating the latch-bar when moved in the opposite direction. A trip 27 for operating the dog 25 is carried by the track section 8, and is pivoted to the track section by a pin 28 so that it is stationary when the dog strikes it in a direction adapted to retract the latch-bar and dump the material.

A winding mechanism 30 is mounted on the turntable and is provided with a winding cable 31 which is secured to the truck. The winding mechanism is of any approved construction, and it is driven by an electric motor 32 of any suitable kind, also mounted on the turntable, and preferably stopped and started by devices operated from the mine shafts at points remote from the turntable.

A signal light 34 is provided and is preferably supported above the turntable. This signal is an electric light, and it is provided with a switch 35 of any approved sort for controlling it. A switch-bar 36 is slidable longitudinally in guides 37 on the track section 8, and is operated by a dog 38 which is pivoted to the track section 8 by a pin 39. When one of the truck wheels strikes the dog 38, as the truck is hauled up the track section, it turns the dog 38 and closes the switch so as to turn on the lamp. When the truck moves down the track section the dog 38 turns on its pin without operating the switch-bar. The switch-bar 36 has a projection 39' on its upper end portion, and when a truck wheel strikes this projection it slides the switch-bar longitudinally and opens the switch.

A chute 40 is secured to the track section 8, and the signal light is arranged so that it is turned on by the switch-bar when the truck bottom is lowered and the material is dumped down the chute 40. The upper end portion of the chute 40 is secured to the lower end portion of the inclined track section 8, and the chute is arranged radially of the pivot of the turntable and is inclined downwardly in the reverse direction to the track section 8 so that it may discharge the material under the central portion of the frame toward the axis of the turntable. When all the material is dumped, the truck is drawn farther up the track section 8 by the electric winding engine so as to close the bottom 14 and turn off the light. The truck bottom 14 is closed by means of an inclined guide 41 arranged at the upper part of the track section 8 and secured to the turntable, and set at a steeper angle than the track section 8.

When the truck bottom has been raised a projection 42 on the higher end of the latch-bar 22 strikes a buffer 43 on the track or turntable, and the latch-bar is thereby pushed longitudinally so that the latch 24 reëngages with the catch 19.

The loaded truck is drawn from its mine shaft by the winding engine, and is dumped automatically when it arrives at the proper point on the track section 8, the signal light showing to the operator at the mine shaft when the dumping is complete. The truck is then drawn a little farther up the track section to close its bottom and turn off the signal light. The motor is then reversed to send the truck back to the mine shaft, or to any other desired mine shaft, the turntable being turned in a suitable manner to connect with any desired track.

Only one truck is required to operate with a number of mine shafts, and a skilled operator at the dump is not required, as the turntable can be turned by unskilled labor. The winding cable is freed from the wear of being passed around guide pulleys which are generally required in apparatus for dumping mine trucks as ordinarily constructed.

What I claim is:

1. A supporting frame provided with concentric tracks arranged at different levels, a turntable for supporting a winding mechanism for operating a truck, said turntable being mounted on the upper track and provided with an inclined radial track section the lower end portion of which is supported by the lower track, and a plurality of stationary tracks arranged radially and adapted to connect with the said track section.

2. A supporting frame provided with concentric curved tracks arranged at different levels, a turntable mounted on the upper track and provided with a downwardly inclined track section the lower end portion of which is supported by the lower track, a plurality of stationary railroad tracks arranged radially of the turntable and adapted to connect with the said track section, a winding device mounted on the turntable and provided with a winding cable, and a truck operated by the cable and running on the said tracks and track section.

3. A supporting frame provided with an upper curved track and a lower curved track arranged concentric of the upper track but at a greater distance from its center or pivot and at a lower level a turntable for supporting a winding mechanism for operating a truck, said turntable being pivoted to the frame and provided with an inclined radial track section, wheels which run on the said curved tracks and support the said turntable and inclined track section respectively, and a plurality of stationary tracks arranged radially and adapted to connect with the said track section.

4. A supporting frame provided with concentric tracks arranged at different levels, a turntable for supporting a winding mechanism for operating a truck, said turntable being mounted on the upper track and provided with an inclined radial track section the lower end portion of which is supported by the lower track, a radial chute inclined in the opposite direction to the said track section and having its upper end portion secured to the lower end portion of the said track section, and a plurality of stationary tracks arranged radially and adapted to connect with the said track section.

In testimony whereof I have affixed my signature.

ARTHUR LOVELL.